I. L. EDWARDS.
WIRE BRACKET OR HOLDER AND INSULATOR.
APPLICATION FILED MAR. 5, 1908.
904,945.
Patented Nov. 24, 1908.
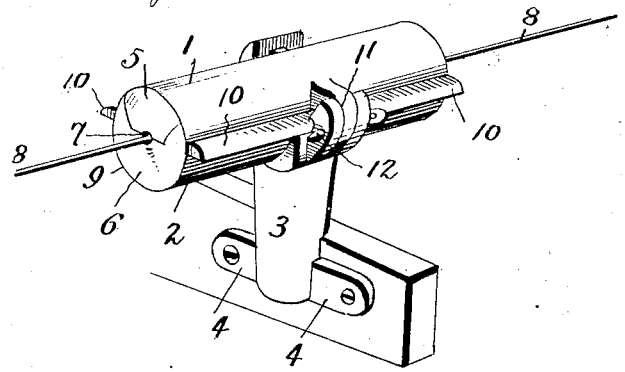
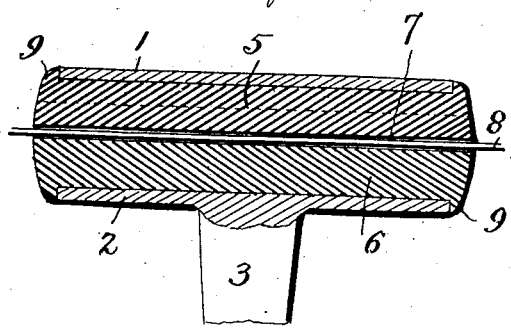
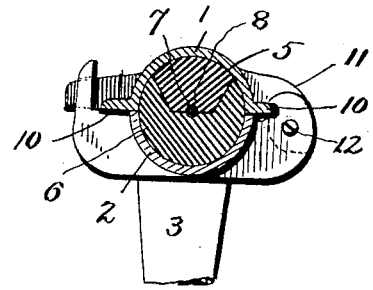
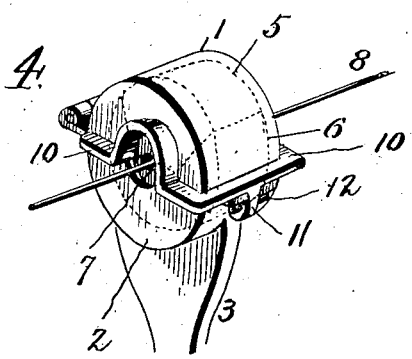
Witnesses
C. W. Rogers
R. B. Thomas
Inventor
Isaac L. Edwards,
By Prindle and Williamson
Attorneys

UNITED STATES PATENT OFFICE.

ISAAC L. EDWARDS, OF AURORA, ILLINOIS.

WIRE BRACKET OR HOLDER AND INSULATOR.

No. 904,945.

Specification of Letters Patent.

Patented Nov. 24, 1908.

Application filed March 5, 1908. Serial No. 419,380.

*To all whom it may concern:*

Be it known that I, ISAAC L. EDWARDS, of Aurora, in the county of Kane, and in the State of Illinois, have invented a certain new and useful Improvement in Wire Brackets or Holders and Insulators, and do hereby declare that the following is a full, clear, and exact description thereof, reference being had to the accompanying drawings, in which—

Figure 1 is a perspective view of a wire bracket or holder and insulator embodying my invention; Fig. 2 a longitudinal section thereof; Fig. 3 a cross section; and Fig. 4 a view in perspective of a different form of my invention.

The object of my invention is to provide a bracket or holder and insulator for electric wires, which will be durable and capable of ready and quick application, and which, while constituting a strong support for the wire, will perfectly insulate the same, and to this end my invention consists in the bracket and insulator constructed substantially as hereinafter specified and claimed.

In carrying my invention into practice, I provide a metal box or shell composed of two matching parts or halves, designated 1 and 2, respectively, in the drawings, the section or half 2 being integral with an arm 3 which has feet 4, by means of which the bracket may be secured, as by screws or bolts, to a post or pole, or other device or structure, from which the wire is to be supported. The box section or half 1 is movably and preferably pivotally connected to the other section, to give access to the interior of the box or shell for the placing in or removal therefrom of an insulating block or body of wood, or other suitable material, made in two separable longitudinally divided sections or members, designated 5 and 6, respectively, the two sections together being preferably of cylindrical form, and one being formed with a longitudinal groove that is V-shaped in cross section, to receive the other section that is correspondingly shaped, and the abutting surfaces of the two sections on a diametrical line being provided with coinciding longitudinally extending grooves or channels 7, of a diameter to be snugly fitted by the wire 8. The interlocking form of the two sections prevents any tendency to lateral displacement, and to prevent longitudinal displacement, as well as to provide a body of insulating material at opposite ends of the box or shell, which will prevent the possibility of contact of the wire with the box or shell, the insulator sections have at each end a flange 9 that forms a head that overlaps the adjacent end of the box or shell on the outside of the latter. To prevent the entrance of water into the box or shell, and the possible damaging effect thereof upon the insulating material, the upper section or half 1 of the box or shell, has an outwardly projecting flange 10 where the two box sections come together or abut, which flange projects beyond the joint between them, so that water will drip or fall off the outer edges of the flange, and not pass through the joint.

By reason of the interlocking form of the two sections 5 and 6, which places the joints at the periphery in a different vertical plane from the joints between the two sections of the box or shell, so that the joints between the two insulator sections 5 and 6, and the joints between the box or shell sections 1 and 2, are out of coincidence or alinement, the structure as an entirety is stronger, since lateral pressure due to the swaying of the wire is transmitted through the insulator sections 5 and 6 to solid portions of the shell or box, and the access of water between the abutting faces of the insulator sections 5 and 6, and to the wire between them, is prevented. The joint between the two insulator sections comprises a diametrically extending portion and two outwardly inclined portions.

To secure the two sections of the box or shell together in a closed position, the upper section 1 has a lug 11 that is perforated for the reception of a locking pin 12.

It will be evident from the divided or separable form of the box or shell, and the divided or separable form of the block or insulating material, the work of construction and repair may be done very rapidly, since the wire does not have to be threaded or passed through the device, but the latter with its parts in their separated condition, is assembled at whatever position on the wire it is desired or necessary for the support and insulation of the wire.

As shown in Fig. 4, an embodiment of my invention is illustrated in which the insulator has no flanges that project on the outside of the bracket, but the insulator is contained wholly within the box or shell, and the latter at its ends is provided with a hole of sufficient diameter to prevent contact of the wire with the box or shell.

My bracket and insulator can be applied in all positions which the exigencies of the location of the wire may require.

Having thus described my invention, what I claim is—

1. A bracket and insulator comprising a box or shell made of separable sections, one of said sections having flanges that project beyond the joint between the sections when placed together said joint being in a horizontal plane, and a body of insulating material in the box or shell said body being of two sections which receive the wire to be insulated between them and which have a joint that is in a different vertical plane with the joint between the box or shell sections.

2. A bracket and insulator comprising a box or shell made of separable sections that are united by a joint in a horizontal plane, and an insulator within the box or shell formed of separable sections, one of said sections having a longitudinally extending recess or groove in which is seated the other section forming a joint between the sections, which extends diametrically in the interior portion of the insulator and thence outwardly and reaches the periphery of the insulator in a different plane from the plane of the joint between the box or shell sections.

In testimony that I claim the foregoing I have hereunto set my hand.

ISAAC L. EDWARDS.

Witnesses:
H. DEUCHLER,
J. W. PETREE.